US009381849B2

(12) United States Patent
Shibata

(10) Patent No.: US 9,381,849 B2
(45) Date of Patent: Jul. 5, 2016

(54) VEHICLE HEADLAMP

(71) Applicant: KOITO MANUFACTURING CO., LTD., Tokyo (JP)

(72) Inventor: Hiroki Shibata, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 13/943,839

(22) Filed: Jul. 17, 2013

(65) Prior Publication Data

US 2014/0022806 A1    Jan. 23, 2014

(30) Foreign Application Priority Data

Jul. 18, 2012    (JP) ................................. 2012-160007

(51) Int. Cl.
*F21V 17/02*    (2006.01)
*B60Q 1/06*    (2006.01)
(Continued)

(52) U.S. Cl.
CPC *B60Q 1/06* (2013.01); *B60Q 1/076* (2013.01); *B60Q 1/0483* (2013.01); *F21S 48/115* (2013.01); *F21S 48/1159* (2013.01)

(58) Field of Classification Search
CPC ...... B60Q 1/0483; B60Q 1/0683; B60Q 1/06; B60Q 1/076; B60Q 1/068; B60Q 1/04; F21S 48/115; F21S 48/1159; F21S 48/1104; F21S 48/1721; F21S 48/1736; F21S 48/1742; F21S 48/1752; F21S 48/1757
USPC ......... 362/512, 514, 515, 523, 524, 528, 529, 362/530, 538, 539, 547, 548, 549, 516, 526, 362/531, 508
See application file for complete search history.

(56) References Cited

U.S. PATENT DOCUMENTS 4,895,693 A * 1/1990 Suzuki et al. ................. 362/544
6,086,231 A * 7/2000 Kenjo et al. .................. 362/507
(Continued)

FOREIGN PATENT DOCUMENTS

CN    102486280 A    6/2012
CN    102628576 A    8/2012
(Continued)

OTHER PUBLICATIONS

Extended European Search Report issued in corresponding European Application No. 13177003.4, mailed Nov. 12, 2013 (6 pages).
(Continued)

*Primary Examiner* — Ismael Negron
*Assistant Examiner* — James Endo
(74) *Attorney, Agent, or Firm* — Osha Liang LLP

(57) ABSTRACT

A vehicle headlamp includes a lamp body including a lamp housing having an opening and a cover covering the opening in the lamp housing, and a lamp unit disposed in the lamp body and including, a light source unit having a light source configured to emit light, a structural unit having a projection lens configured to project the light emitted from the light source and a lens holder configured to hold the projection lens, an irradiating direction changing mechanism configured to change an irradiating direction of the light emitted from the light source and projected by the projection lens, and a bracket configured to being operated by a driving force of the irradiating direction changing mechanism and to change an orientation of an optical axis of the projection lens. The structural unit and the light source unit are mounted on the bracket.

5 Claims, 6 Drawing Sheets

(51) Int. Cl.
*B60Q 1/076* (2006.01)
*F21S 8/10* (2006.01)
*B60Q 1/04* (2006.01)

(56) References Cited

U.S. PATENT DOCUMENTS

| | | | |
|---|---|---|---|
| 6,186,651 B1* | 2/2001 | Sayers et al. | 362/512 |
| 6,220,735 B1 | 4/2001 | Matubara | |
| 7,201,505 B2* | 4/2007 | Sugimoto et al. | 362/539 |
| 7,621,663 B2* | 11/2009 | Tajima et al. | 362/530 |
| 8,632,228 B2 | 1/2014 | Shibata et al. | |
| 2001/0040810 A1* | 11/2001 | Kusagaya | 362/351 |
| 2003/0090906 A1* | 5/2003 | Hayakawa | 362/517 |
| 2004/0213012 A1* | 10/2004 | Fukawa et al. | 362/539 |
| 2005/0024889 A1* | 2/2005 | Sugimoto | 362/539 |
| 2005/0152151 A1* | 7/2005 | Lisowski et al. | 362/513 |
| 2006/0239023 A1* | 10/2006 | Tsai | 362/539 |
| 2007/0058387 A1 | 3/2007 | Takada | |
| 2007/0082577 A1* | 4/2007 | Tajima | 445/66 |
| 2007/0147060 A1* | 6/2007 | Chen | 362/513 |
| 2007/0147061 A1* | 6/2007 | Lee et al. | 362/513 |
| 2008/0112177 A1* | 5/2008 | Kuwahara et al. | 362/512 |
| 2009/0059612 A1* | 3/2009 | Yang et al. | 362/513 |
| 2010/0110713 A1* | 5/2010 | Tajima | 362/524 |
| 2010/0165654 A1* | 7/2010 | Okubo et al. | 362/539 |
| 2010/0177527 A1* | 7/2010 | Tsutsumi et al. | 362/538 |
| 2010/0244649 A1* | 9/2010 | Inaba | F21K 9/00 313/46 |
| 2010/0246204 A1* | 9/2010 | Inaba | F21S 48/1159 362/539 |
| 2010/0253223 A1* | 10/2010 | Inoue et al. | 315/82 |
| 2011/0170308 A1* | 7/2011 | Kinoshita et al. | 362/516 |
| 2012/0113662 A1 | 5/2012 | Shibata et al. | |
| 2012/0140505 A1 | 6/2012 | Tsukamoto | |
| 2013/0229819 A1* | 9/2013 | Koo | 362/524 |
| 2013/0265792 A1 | 10/2013 | Koo | |

FOREIGN PATENT DOCUMENTS

| | | |
|---|---|---|
| EP | 0275095 A2 * | 7/1988 |
| EP | 2338728 A1 * | 6/2011 |
| JP | 2001-250407 A | 9/2001 |
| JP | 2008-094196 A | 4/2008 |
| JP | 2011-065960 A | 3/2011 |
| JP | 2011150993 A | 8/2011 |

OTHER PUBLICATIONS

First Office Action issued in corresponding Chinese Application No. 201310301365.3, mailed on Mar. 20, 2015 (13 pages).
Office Action issued in corresponding European Application No. 13177003.4, mailed on Mar. 17, 2015 (7 pages).
Notification of Reasons for Refusal issued in corresponding Japanese Application Na 2012-160007, mailed on Mar. 10, 2016 (9 pages).

* cited by examiner

VEHICLE HEADLAMP

CROSS-REFERENCE TO RELATED APPLICATION(S)

The present application claims the benefit of priority of Japanese Patent Application No. 2012-160007 filed on Jul. 18, 2012. The disclosures of the application are incorporated herein by reference.

BACKGROUND

1. Technical Field

The present disclosure relates to a vehicle headlamp.

2. Related Art

In some vehicle headlamps, a lamp unit having a light source is disposed in a lamp body which is defined by a cover and a lamp housing.

In some of lamp units of vehicle headlamps, a projection lens for projecting light emitted from a light source and an irradiating direction changing mechanism for changing the irradiating direction of light projected by the projection lens are provided in a lamp unit (for example, refer to Patent Literature 1). The projection lens is held by a lens holder, and the lens holder is held on a frame (a bracket).

As such an irradiating direction changing mechanism, there are, for example, a level controlling mechanism and a swivel controlling mechanism. The level controlling mechanism controls the orientation of an optical axis of a headlamp which changes according to the weight and position of a load carried by a vehicle. The swivel controlling mechanism controls the orientation of the optical axis of the headlamp so as to follow the traveling direction of the vehicle.

As the irradiating direction changing mechanism, for example, an actuator is provided which has a drive source and an output portion which is operated by means of the driving force of the drive source. The output portion is connected to a frame (a bracket) which holds a lens holder and a reflector.

When the frame is operated by the driving force of the actuator, the lens holder and the reflector which are held on the frame are operated in association with the operation of the frame, whereby the optical axis direction of the projection lens is changed to execute the leveling operation and/or the swiveling operation of the headlamp.

[Patent Literature 1] JP-A-2011-150993

In the vehicle headlamp described above, although the lens holder holding the projection lens is mounted on the frame (the bracket), since other constituent components than the projection lens and the lens holder such as a light source are mounted on the frame, depending upon the arrangement of these components, the number of constituent components is increased, leading to fears that the attempt to reduce the size of the headlamp is interrupted.

SUMMARY

Exemplary embodiments of the invention provide a vehicle headlamp which can reduce the number of components involved and realize a reduction in size of the head lamp.

A vehicle headlamp according to an exemplary embodiment of the invention, comprises:
a lamp body including a lamp housing having an opening and a cover covering the opening in the lamp housing, and
a lamp unit disposed in the lamp body and including, a light source unit having a light source configured to emit light, a structural unit having a projection lens configured to project the light emitted from the light source and a lens holder configured to hold the projection lens, an irradiating direction changing mechanism configured to change an irradiating direction of the light emitted from the light source and projected by the projection lens, and a bracket configured to being operated by a driving force of the irradiating direction changing mechanism and to change an orientation of an optical axis of the projection lens. The structural unit and the light source unit are mounted on the bracket.

According to the exemplary embodiment, the structural unit and the light source unit are mounted on the single member common.

Since, the structural unit and the light source unit are mounted on the bracket which is the single member common thereto, this obviates the necessity of separate members on which the structural unit and the light source unit are mounted, respectively, thereby making it possible not only to reduce the number of components involved but also to realize a reduction in size of the headlamp.

The structural unit may be mounted on the bracket from a front of the bracket, and the light source unit may be mounted on the bracket from a rear of the bracket.

Consequently, there is caused no such situation that the structural unit and the light source unit interfere with each other when they are mounted on the bracket, thereby making it possible to realize an increase in working efficiency in mounting the structural unit and the light source unit on the bracket.

The irradiating direction changing mechanism may be mounted on the bracket.

Consequently, since the structural unit, the light source unit and the irradiating direction changing mechanism are connected to the bracket, not only a further reduction in the number of components involved but also a further reduction in size of the headlamp can be realized.

The bracket may be configured to be able to rotate relative to the lamp housing.

Consequently, the structural unit and the light source unit which are mounted on the bracket can be rotated in a required direction by the simple mechanism, thereby making it possible to increase the degree of freedom in changing the irradiating direction while ensuring the simplified mechanism.

DETAILED DESCRIPTION

Hereinafter, exemplary embodiments of a vehicle headlamp according to the invention will be described by reference to the drawings.

Figure 1:
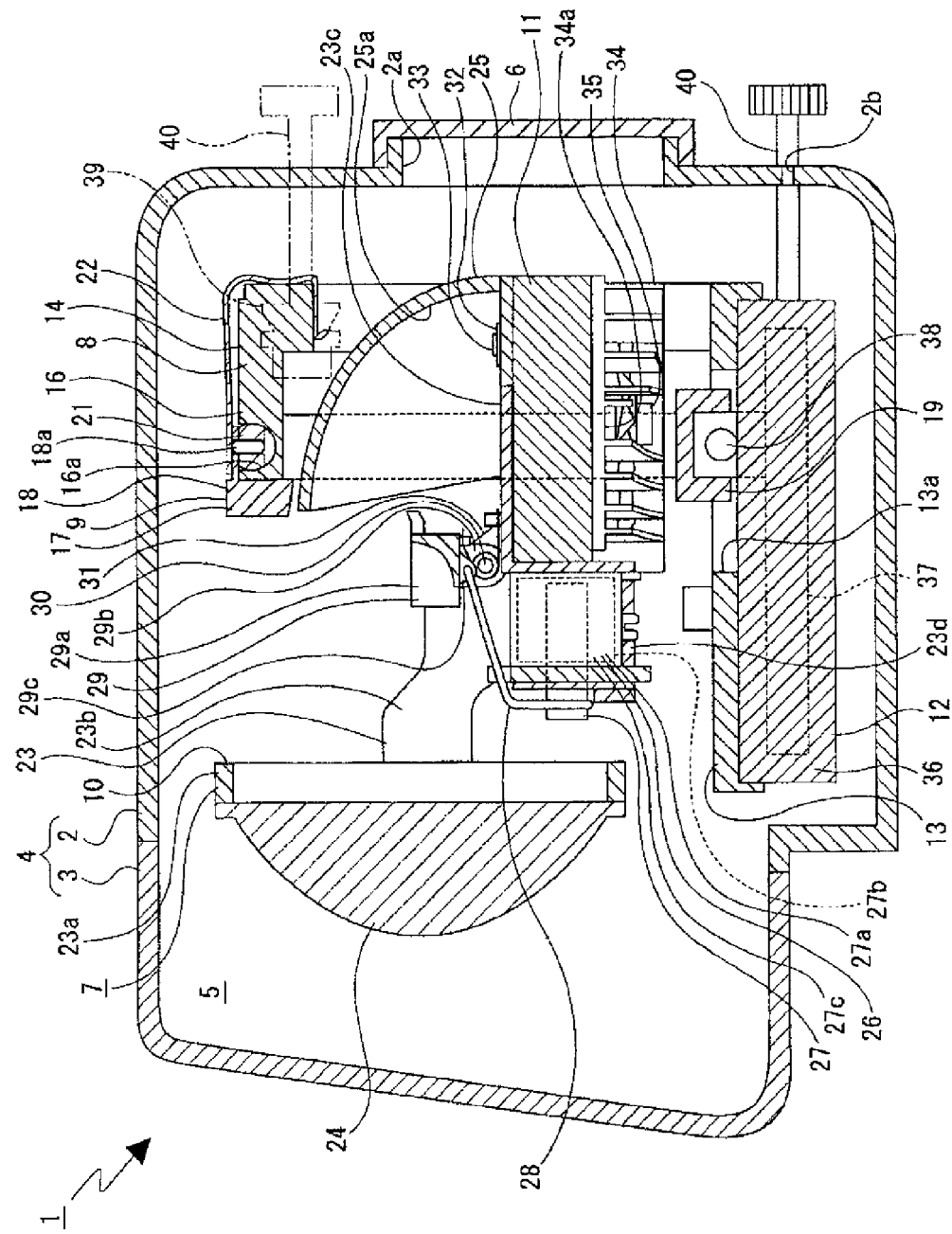
FIG. 1 is a schematic vertical sectional view showing a vehicle headlamp according to a first embodiment of the invention.
Figure 2:
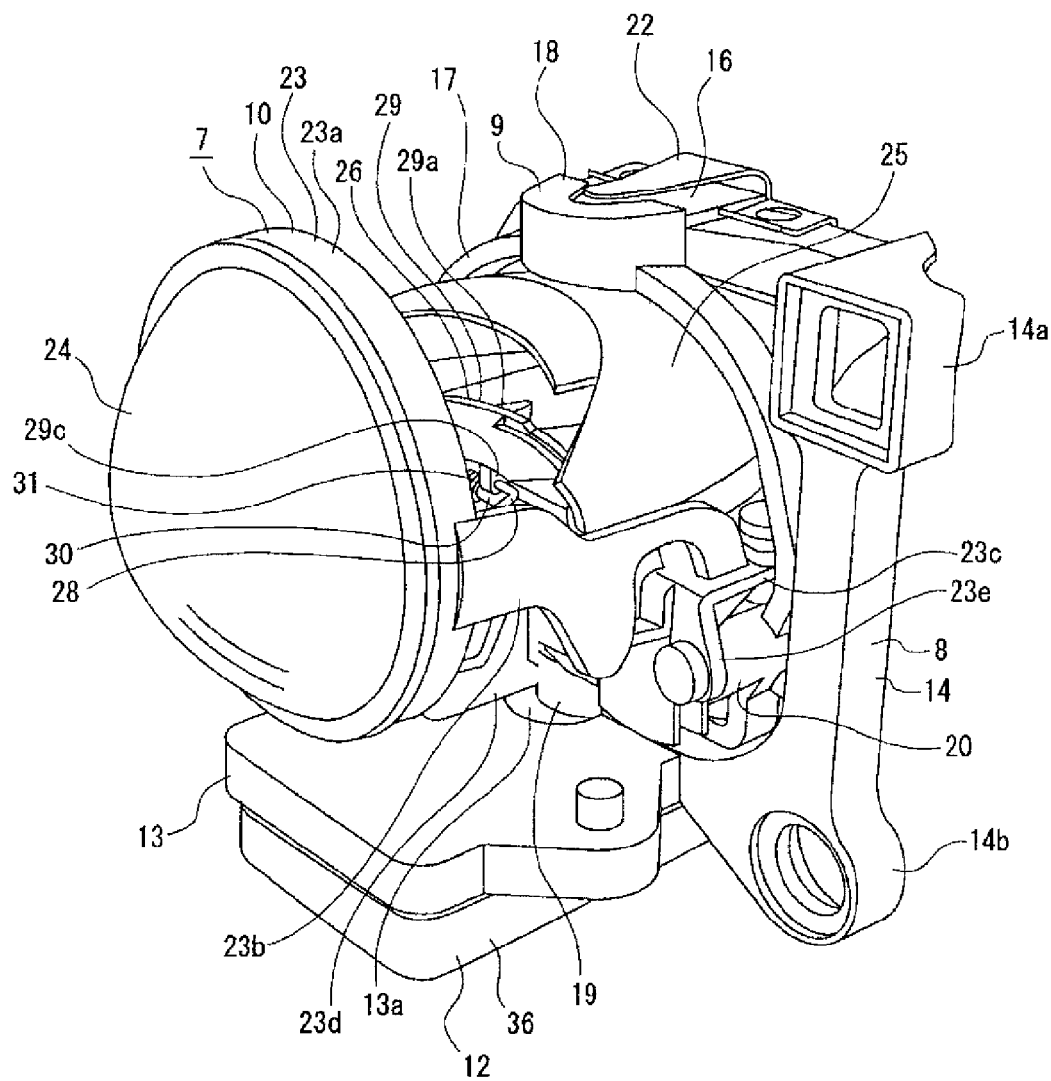
FIG. 2 is a perspective view of a lamp unit and the like according to the first embodiment of the invention.
Figure 3:
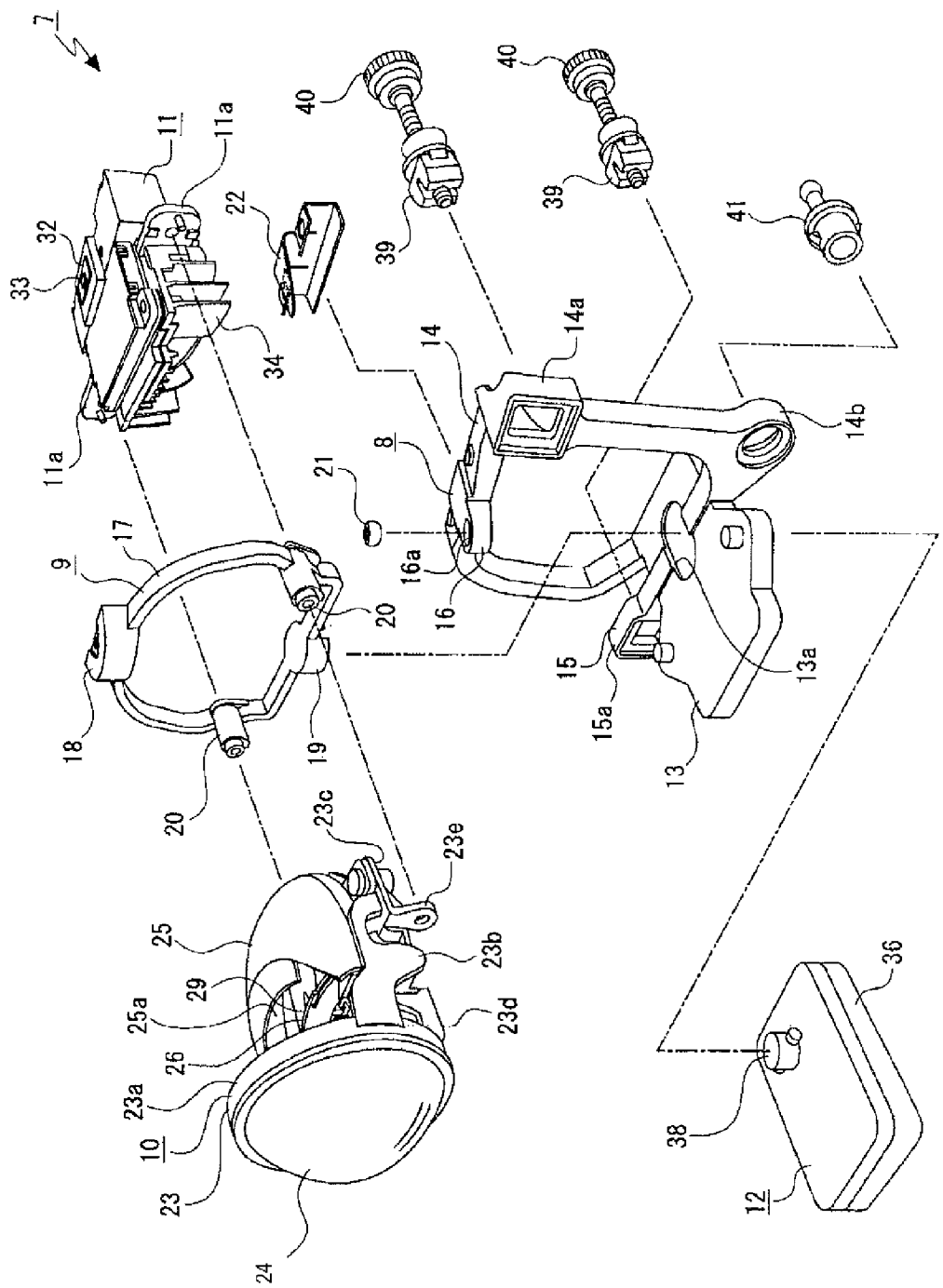
FIG. 3 is an exploded perspective view of the lamp unit and the like according to the first embodiment of the invention.

Firstly, a vehicle headlamp 1 according to a first embodiment will be described (by reference to FIGS. 1 to 3).

Vehicle headlamps 1 are individually mounted and disposed at left and right end portions at a front end portion of a vehicle body.

Each headlamp 1 includes a lamp housing 2 having a recess portion which is opened at the front thereof and a cover 3 which covers the opening in the lamp housing 2. The lamp housing 2 and the cover 3 make up a lamp body 4, and an interior space in the lamp body 4 is defined as a lamp chamber 5.

A mounting hole 2a is formed in a rear end portion of the lamp housing 2 so as to penetrate the rear end portion in a front-to-rear direction. Shaft insertion holes 2b, 2b are formed in the rear end portion of the lamp housing 2 so as to penetrate the rear end portion in the front-to-rear direction while being separated transversely. A back cover 6 is mounted on the mounting hole 2a.

A lamp unit 7 is disposed in the lamp chamber 5. The lamp unit 7 has a support base 8, a bracket 9, a structural unit 10, a light source unit 11 and an irradiating direction changing mechanism 12.

The support base 8 is supported in the lamp housing 2 so as to be tilted freely by an aiming adjusting mechanism. The support base 8 includes a mechanism mounting portion 13 which is oriented in a substantially vertical direction, a holding frame portion 14 which projects upwards from a rear end of the mechanism mounting portion 13, and a projecting portion 15 which projects sideways from the rear end of the mechanism mounting portion 13.

An insertion hole 13a is formed in the mechanism mounting portion 13, and the insertion hole 13a is elongated in the front-to-rear direction and penetrates the mechanism mounting portion 13 vertically.

A hanging portion 16 is provided at an upper end portion of the holding frame portion 14. A bearing disposing hole 16a, which is opened upwards, is formed in the hanging portion 16. A surface forming the bearing disposing hole 16a is made into a spherical shape.

Cylindrical mechanism connecting portions 14a, 14b are provided on one of side portions of the holding frame portion 14 so as to be spaced apart vertically from each other.

A cylindrical mechanism connecting portion 15a is provided at a distal end portion of the projecting portion 15.

The bracket 9 includes a frame-shaped base portion 17, a supported portion 18 which is provided at an upper end portion of the base portion 17, a connecting portion 19 which is provided at a lower end portion of the base portion 17 and mounting shaft portions 20, 20 which are provided so as to project to the front in positions which are situated near a lower end at left and right end portions of the base portion 17. A supported shaft 18a, which projects downwards, is provided at the supported portion 18.

The supported shaft 18a of the bracket 9 is inserted into a spherical bearing 21 having a substantially spherical shape from above, and the spherical bearing 21 is inserted into the bearing disposing hole 16a formed in the hanging portion 16 of the support base 8 from above. The spherical bearing 21 can be rotated in any direction in the bearing disposing hole 16a, and the bracket 9 is rotated on the spherical bearing 21 as a fulcrum in association with the rotation of the spherical bearing 21.

With the bracket 9 supported on the holding frame portion 14 of the support base 8 via the spherical bearing portion 21, a fastening spring 22 is mounted on the hanging portion 16 and the supported portion 18. The supported portion 18 is pressed against the hanging portion 16 from above by a fastening spring 22, whereby the dislocation of the supported portion 18 from the hanging portion 16 is prevented.

The structural unit 10 includes a lens holder 23, as well as a projection lens 24, a reflector 25 and a light quantity control mechanism 26 which are mounted individually on the lens holder 23.

The lens holder 23 has an arc-shaped lens mounting portion 23a which has an opening penetrating in the front-to-rear direction, side portions 23b, 23b which project individually to the rear from left and right end portions of the lens mounting portion 23a, a mounting surface portion 23c which is provided between the side portions 23b, 23b, a mechanism mounting portion 23d which is provided to connect continuously to a front side of the mounting surface portion 23c and mounted piece portions 23e, 23e which project downwards from left and right end portions of the mounting surface portion 23c.

The side portions 23b, 23b are formed into plates which are oriented substantially leftwards and rightwards. The mounting surface portion 23c is formed into a plate which is oriented vertically and projects to the rear from the side portions 23b, 23b excluding its front end portion. The mechanism mounting portion 23d is formed into a box which is opened at least upwards.

The projection lens 24 has a substantially semispherical shape and is mounted on the lens mounting portion 23a of the lens holder 23.

An inner surface of the reflector 25 is formed into a reflecting surface 25a. The reflector 25 is mounted on an upper surface of the mounting surface portion 23c with a screw.

The light quantity control mechanism 26 has an actuator 27, a transmission member 28 and a movable shade 29.

The actuator 27 has a yoke case 27a, a coil element 27b which is disposed in the yoke case 27a, and an output shaft 27c which is enabled to move in the front-to-rear direction.

The actuator 27 is mounted on the mechanism mounting portion 23d at the yoke case 27a, and a front end portion of the output shaft 27c projects to the front from the mechanism mounting portion 23d.

The transmission member 28 is, for example, a wire-like member having one end portion connected to an end portion of the output shaft 27c which projects to the front from the yoke case 27a.

The movable shade 29 has a light quantity control portion 29a which is formed into a substantially arc-like surface, connecting arm portions 29b, 29b which individually project substantially downwards from positions on the light quantity control portions 29a which lie close to left and right ends thereof, and a connecting projecting portion 29c which projects substantially downwards from a substantially transversely central portion of the light quantity control portion 29a. The other end portion of the transmission member 28 is connected to the connecting projecting portion 29c of the movable shade 29.

A transversely extending rotational shaft 30 is connected to the connecting arm portions 29b, 29b of the movable shade 29. The rotational shaft 30 is supported by bearing portions, not shown, which are provided on the mounting surface portion 23c at end portions thereof.

The movable shade 29 is rotated on the rotational shaft 30 as a fulcrum between a first position and a second position where a low beam light distribution pattern for illuminating a near-distance area and a high beam light distribution pattern for illuminating a far-distance area, respectively.

A biasing spring 31, which is, for example, a coil spring, is fitted on the rotational shaft 30 so as to be supported thereon. The movable shade 29 is biased by the biasing spring 31 in a direction in which the movable shade 29 is rotated from the second position to the first position.

In the light quantity control mechanism 26, when no driving current is supplied to the coil element 27b of the actuator 27, the movable shade 29 is held in the first position by the biasing spring 31.

When the coil element 27b of the actuator 27 is energized, the output shaft 27c is moved in a direction in which the output shaft 27c is drawn into the yoke case 27a, and the transmission member 28 is moved to the rear in association with the movement of the output shaft 27c, whereby the movable shade 29 is rotated from the first position to the second position against the biasing force of the biasing spring 31.

When energizing the coil element 27b is stopped, the output shaft 27c is moved in a direction in which the output shaft 27c projects from the yoke case 27a by means of the biasing force of the biasing spring 31, and the transmission member 28 is moved to the front in association with the movement of the output shaft 27c, whereby the movable shade 29 is rotated from the second position to the first position to thereby be held in the first position again.

The structural unit 10 configured in the way described heretofore is mounted on the bracket 9 from a front side of the bracket 9 with the mounted piece portions 23e, 23e of the lens holder 23 individually, mounted at front end portions of the mounting shaft portions 20, 20 with screws.

The light source unit 11 has a circuit board 32 and a light source 33 which is mounted on an upper surface of the circuit board 32. As the light source 33, for example, a light emitting diode (LED) is used.

Mounted pieces 11a, 11a are provided on the light source unit 11 so as to project sideways (outwards). A heat sink 34 is provided on the light source unit 11 so as to be positioned below the circuit board 32. The heat sink 34 has at least an inserting and disposing recess portion 34a which is opened downwards.

A cooling fan 35 is disposed in the inserting and disposing recess portion 34a of the heat sink 34.

The light source unit 11 configured in the way described above is mounted on the bracket 9 from a rear side of the bracket 9 with the mounted pieces 11a, 11a mounted on rear end portions of the mounting shaft portions 20, 20 with screws. With the light source unit 11 mounted on the bracket 9, the mounting surface portion 23c of the lens holder 23 is disposed on an upper surface side of the light source unit 11.

When light is emitted from the light source 33, the light emitted is directed to the front or is reflected on the reflecting surface 25a of the reflector 25 and is then projected to the front by the projection lens 24 to illuminate an area ahead of the vehicle.

The irradiating direction changing mechanism 12 is mounted on the mechanism mounting portion 13 of the support base 8 from below. The irradiating direction changing mechanism 12 has a case member 36 which is made thin in the vertical direction, a drive source 37 such as a motor which is disposed in the case member 36, and a shaft-like output portion 38 which projects upwards from the case member 36.

The output portion 38 is moved in the front-to-rear direction and is rotated around an axis thereof by the driving force of the drive source 37.

In the irradiating direction changing mechanism 12, the case member 36 is mounted on the mechanism mounting portion 13, and the output portion 38 projects upwards from the insertion hole 13a. The output portion 38 is connected to the connecting portion 19 of the bracket 9.

In the irradiating direction changing mechanism 12, when the output shaft 38 is moved in the front-to-rear direction by the driving force of the drive source 37, the bracket 9 is rotated on the spherical bearing 21 as a fulcrum in a direction in which a lower end portion is moved substantially in the front-to-rear direction, and the structural unit 10 and the light source unit 11 are rotated in association with the rotation of the bracket 9 for executing a level adjustment in which the orientation of the optical axis which changes according to the weight or the like of the load is adjusted.

On the other hand, in the irradiating direction changing mechanism 12, when the output shaft 38 is rotated around the axis thereof by the driving force of the drive source 37, the bracket 9 is rotated on the spherical bearing 21 as a fulcrum, and the structural unit 10 and the light source unit 11 are rotated substantially transversely in association with the rotation of the bracket 9 for executing a swivel adjustment in which the orientation of the optical axis is adjusted so as to follow the traveling direction of the vehicle.

Connecting members 39, 39 are connected to the mechanism connecting portions 14a, 15a of the bracket 9, respectively, and control shafts 40, 40 are screwed and connected individually to the connecting members 39, 39. The control shafts 40, 40 are inserted into the corresponding shaft insertion holes 2b, 2b which are formed in the lamp housing 2 so as to be supported on the lamp housing 2 in such a way as to rotate around their axes but not to move axially.

A pivot shaft 41 is connected to the mechanism connecting portion 14b of the bracket 9. The pivot shaft 41 is connected to the rear end portion of the lamp housing 2.

The connecting members 39, 39, the control shafts 40, 40 and the pivot shaft 41 function as an aiming adjusting mechanism.

When one of the control shafts 40 is rotated, the lamp unit 7 and the support base 8 are tilted (rotated) together around an axis as a fulcrum which connects the pivot shaft 41 with the connecting member 39 to which the other control shaft 40 is connected, whereby a vertical aiming adjustment or a horizontal aiming adjustment which is an initial adjustment of the optical axis is executed.

In the vehicle headlamp 1 configured in the way described heretofore, a front end of the projection lens 24 constitutes a front end of the lamp unit 7, and a rear end of the reflector 25 constitutes a rear end of the lamp unit 7. In addition, an upper end of the projection lens 24 constitutes an upper end of the lamp unit 7, and a lower end of the irradiating direction changing mechanism 12 constitutes a lower end of the lamp unit 7.

Figure 4:
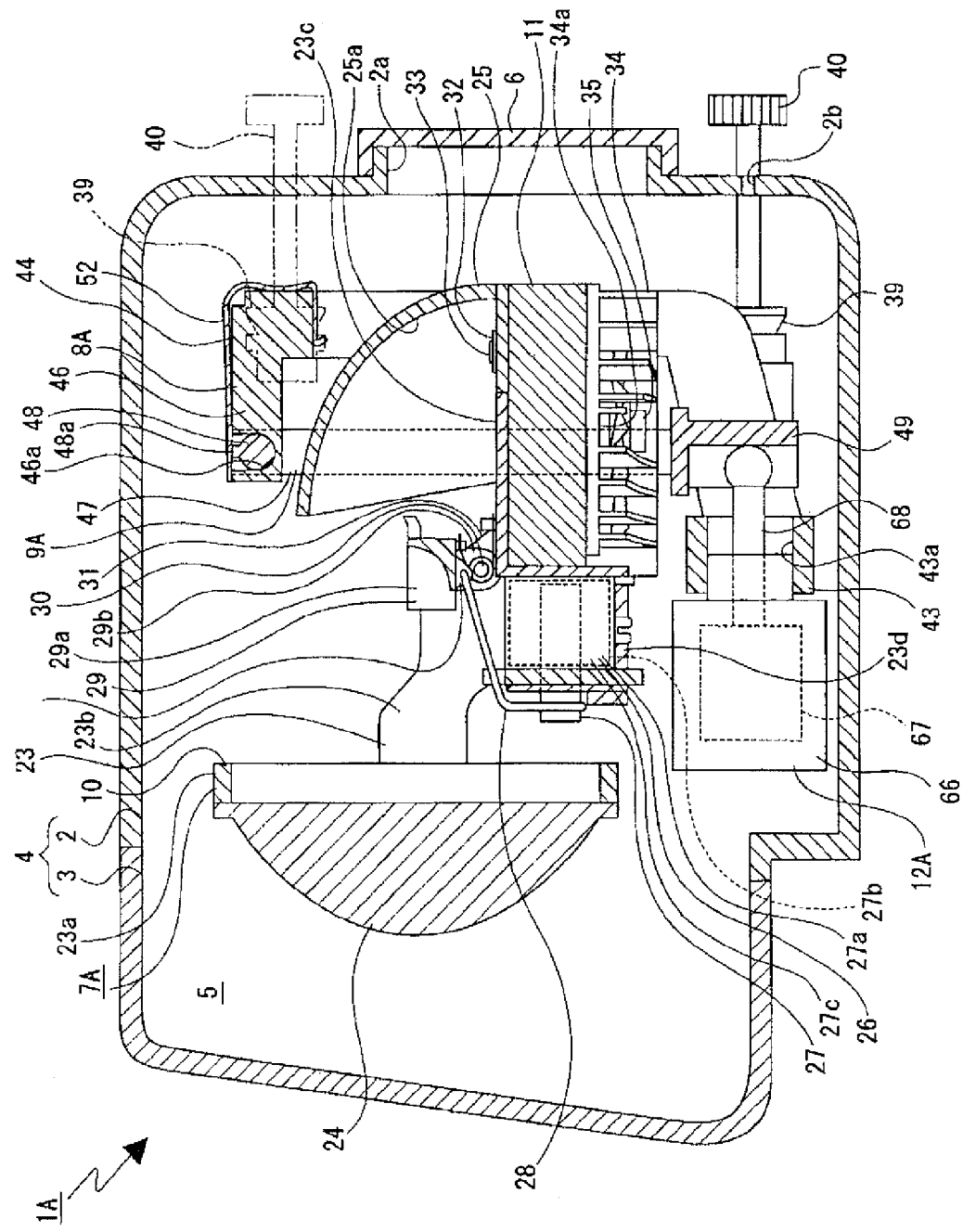
FIG. 4 is a schematic vertical sectional view of a vehicle headlamp according to a second embodiment of the invention.
Figure 5:
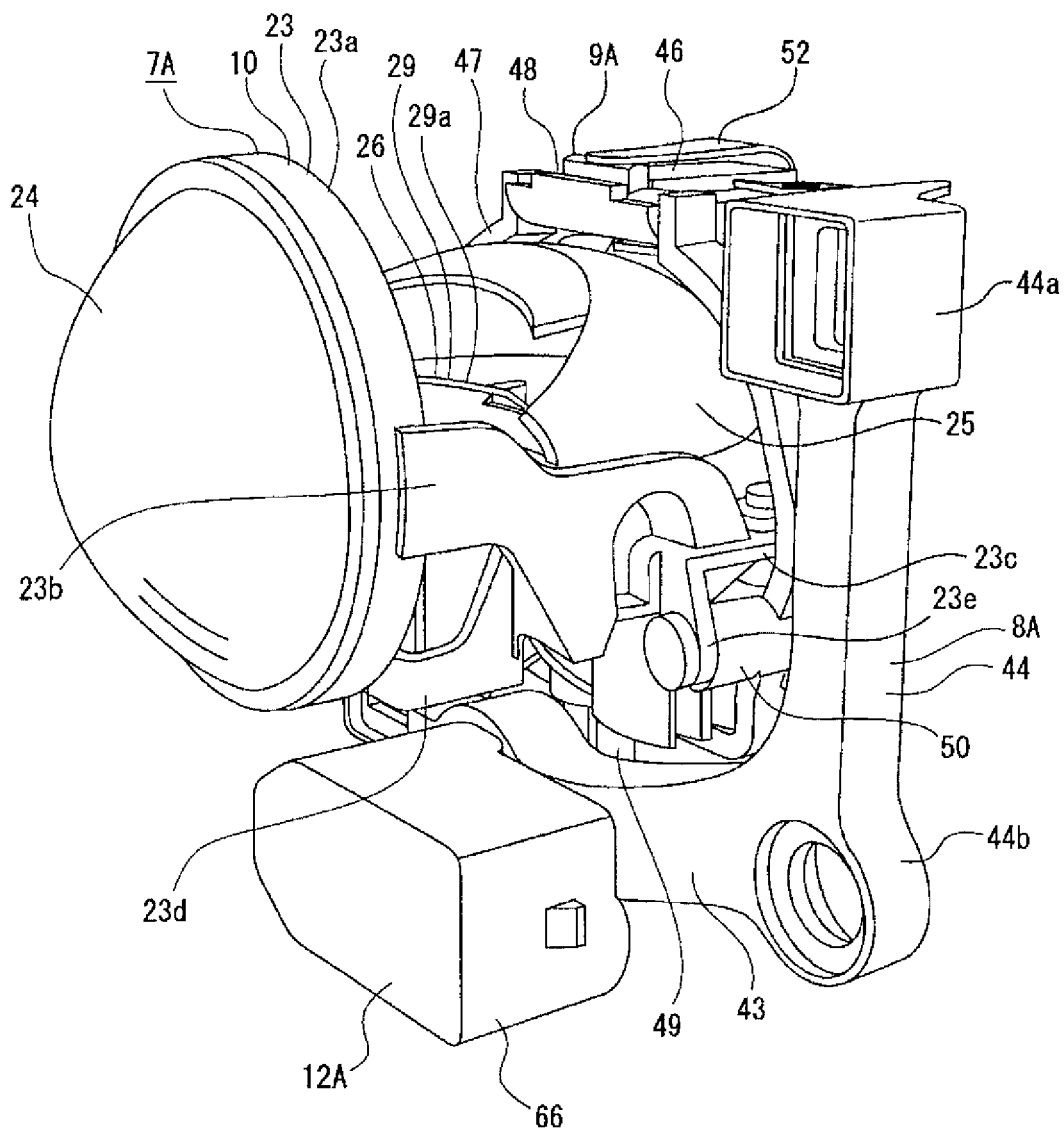
FIG. 5 is a perspective view of a lamp unit and the like according to the second embodiment of the invention.
Figure 6:
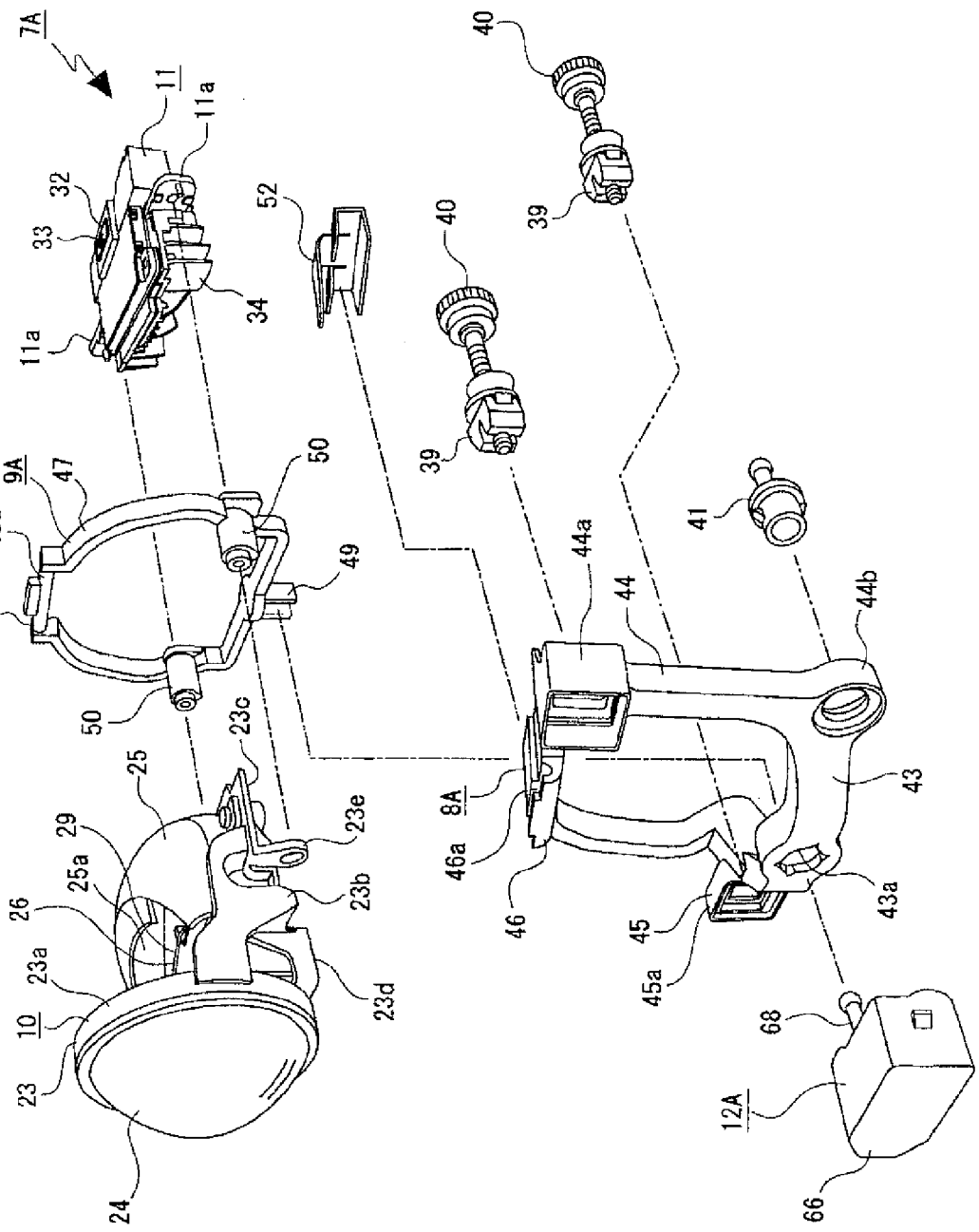
FIG. 6 is an exploded perspective view of the lamp unit and the like according to the second embodiment of the invention.

Next, an automotive vehicle lamp 1A according to a second embodiment will be described (by reference to FIGS. 4 to 6).

When compared with the vehicle headlamp 1 of the first embodiment described above, a vehicle headlamp 1A which will be described below has a support base, a bracket and an irradiating direction changing mechanism which differ in configuration from those of the vehicle headlamp of the first embodiment. Therefore, the configuration of those different constituent parts will be described in detail while giving like reference numerals to like constituent components to those of the vehicle headlamp 1 of the first embodiment, and the description thereof will be omitted here.

A lamp unit 7A is disposed within a lamp chamber 5 in a vehicle headlamp 1A. The lamp unit 7A has a support base 8A, a bracket 9A, a structural unit 10, a light source unit 11, and an irradiating direction changing mechanism 12A.

The support base 8A is supported on a lamp housing 2 by an aiming adjusting mechanism so as to be tilted freely. The support base 8A includes a mechanism mounting portion 43 which is oriented substantially in a front-to-rear direction, a U-shaped holding frame portion 44 that connects continuously to the mechanism mounting portion 43 and which is opened downwards, and a projecting portion 45 which projects sideways from the mechanism mounting portion 43.

An insertion hole 43a is formed in the mechanism mounting portion 43 so as to penetrate it.

A hanging portion 46 is provided at an upper end portion of the holding frame portion 44. A bearing groove 46a is formed in the hanging portion 46, and the bearing groove 46a is opened upwards and extends in a transverse direction.

Cylindrical mechanism connecting portions 44a, 44b are provided on one of side portions of the holding frame portion 44 so as to be spaced away from each other in a vertical direction.

A cylindrical mechanism connecting portion 45a is provided at a distal end portion of the projecting portion 45.

The bracket 9A includes a frame-shaped base portion 47, a supported portion 48 which is provided at an upper end portion of the base portion 47, a connecting portion 49 which is provided at a lower end portion of the base portion 47, and mounting shaft portions 50, 50 which are provided at left and right end portions of the base portion 47 in positions lying close to a lower end thereof so as to project to the front therefrom. A transversely extending supported shaft 48a is provided on the supported portion 48.

The supported shaft 48a of the bracket 9A is inserted in a bearing groove 46a formed in the hanging portion 46 of the support base 8A from above. The supported shaft 48a is rotatable relative to the supported portion 48, and the bracket 9A is rotated on the supported shaft 48a as a fulcrum in a direction in which a lower end portion thereof moves substantially in the front-to-rear direction in association with rotation of the supported shaft 48a.

With the bracket 9A supported on the holding frame portion 44 of the support base 8A, a fastening spring 52 is mounted on the handing portion 46 and the supported portion 48. The supported portion 48 is pressed against the hanging portion 46 from above by the fastening spring 52, whereby the dislocation of the supported portion 48 from the hanging portion 46 is prevented.

The structural unit 10 is mounted on the bracket 9A from a front side of the bracket 9A with mounted piece portions 23e, 23e of a lens holder 23 mounted at front end portions of the mounting shaft portions 50, 50 with screws, respectively.

The light source unit 11 is mounted on the bracket 9A from a rear side of the bracket 9A with mounted pieces 11a, 11a mounted at rear end portions of the mounting shaft portions 50, 50 with screws, respectively.

The irradiating direction changing mechanism 12A is mounted on the mechanism mounting portion 43 of the support base 8A from a front of the support base 8A. The irradiating direction changing mechanism 12A has a case member 66, a drive source 67 such as a motor which is disposed in the case member 66 and a shaft-like output portion 68 which projects to the rear from the case member 66.

The output portion 68 is moved in the front-to-rear direction by the driving force of the drive source 67.

In the irradiating direction changing mechanism 12A, the case member 66 is mounted on the mechanism mounting portion 43, and the output portion 68 projects to the rear from the insertion hole 43a. The output portion 68 is connected to the connecting portion 49 of the bracket 9A.

In the irradiating direction changing mechanism 12A, the drive source 67 is disposed in front of the output portion 68, and the irradiating direction changing mechanism 12A is disposed below a light quantity control mechanism 26 and in front of the bracket 9A. A space is produced below the light quantity control mechanism 26 and in front of the bracket 9A, and the irradiating direction changing mechanism 12A is disposed in this space, thereby making it possible to realize a reduction in size of the lamp unit 7A.

In the irradiating direction changing mechanism 12A, when the output portion 68 is moved in the front-to-rear direction by the driving force of the drive source 67, the bracket 9A is rotated on the supported shaft 48a as a fulcrum in the direction in which the lower end portion thereof moves in the front-to-rear direction, and the structural unit 10 and the light source unit 11 are rotated in association with rotation of the bracket 9A, whereby a level adjustment is executed in which the orientation of an optical axis which changes according to the weight or the like of a load carried by the vehicle is adjusted.

Connecting members 39, 39 are connected to the mechanism connecting portions 44a, 45a of the bracket 9A, respectively, and control shafts 40, 40 are connected to the connecting members 39, 39, respectively, with the control shafts 40, 40 screwed into the corresponding connecting members 39, 39.

A pivot shaft 41 is connected to the mechanism connecting portion 44b of the bracket 9A.

When one of the control shafts 40 is rotated, the lamp unit 7A and the support base 8A are tilted (rotated) together on an axis as a fulcrum which connects the pivot shaft 41 with the connecting member 39 to which the other control shaft 40 is connected, whereby a vertical aiming adjustment or a horizontal aiming adjustment which is an initial adjustment of the optical axis is executed.

In the vehicle headlamp 1A configured as described above, a front end of a projection lens 24 constitutes a front end of the lamp unit 7A, and a rear end of a reflector 25 constitutes a rear end of the lamp unit 7A. Additionally, an upper end of the projection lens 24 constitutes an upper end of the lamp unit 7A, and a lower end of the irradiating direction changing mechanism 12A constitutes a lower end of the lamp unit 7A.

Thus, as has been described above, in the vehicle headlamps 1, 1A, the structural unit 10 and the light source unit 11 are mounted on the brackets 9, 9A.

Consequently, the structural unit 10 and the light source unit 11 are mounted on the brackets 9, 9A which are the single member common thereto, and this obviates the necessity of separate members on which the structural unit 10 and the light source unit 11 are mounted, respectively, thereby making it possible not only to reduce the number of components involved but also to realize a reduction in size of the headlamp.

In addition, the structural unit 10 is mounted on the brackets 9, 9A from the front of the brackets 9, 9A, and the light source unit 11 is mounted on the brackets 9, 9A from the rear of the brackets 9, 9A.

Consequently, there is caused no such situation that the structural unit 10 and the light source unit 11 interfere with each other when they are mounted on the brackets 9, 9A, thereby making it possible to realize an increase in working efficiency in mounting the structural unit 10 and the light source unit 11 on the brackets 9, 9A.

Further, the irradiating direction changing mechanisms 12, 12A are connected to the brackets 9, 9A on which the structural unit 10 and the light source unit 11 are mounted.

Consequently, since the structural unit 10, the light source unit 11 and the irradiating direction changing mechanism 12, 12A are connected to the brackets 9, 9A, not only a further reduction in the number of components involved but also a further reduction in size of the headlamp can be realized.

Furthermore, the brackets 9, 9A are able to rotate relative to the lamp housing 2.

Consequently, the structural unit 10 and the light source unit 11 which are mounted on the brackets 9, 9A can be rotated in a required direction by the simple mechanism, thereby making it possible to increase the degree of freedom in changing the irradiating direction while ensuring the simplified mechanism.

In the embodiments described above, while the structural unit 10 is described as having the lens holder 23, the projection lens 24, the reflector 25 and the light quantity control mechanism 26, the structural unit 10 should have at least the lens holder 23 and the projection lens 24. Consequently, a structural unit made up of the lens holder 23 and the projection lens 24 may be mounted on the brackets 9, 9A.

In addition, a structural unit having another constituent component in addition to the lens holder 23 and the projection lens 24 may be mounted on the brackets 9, 9A. For example, a structural unit which includes the lens holder 23, the projection lens 24 and the reflector 25 or a structural unit which includes the lens holder 23, the projection lens 24 and the light quantity control mechanism 26 may be mounted on the brackets 9, 9A.

Further, in the embodiments, while the vehicle headlamps 1, 1A are described as having the reflector 25, the invention can also be applied to a so-called direct projection type vehicle headlamp which has no reflector.

The shapes and constructions of the constituent members described in the embodiments for carrying out the invention are all described as only the examples made in carrying out the invention, and hence, the technical scope of the invention should not be construed as being limited by those examples described in the embodiments.

What is claimed is:

1. A vehicle headlamp comprising:
a lamp body including a lamp housing having an opening and a cover covering the opening in the lamp housing; and
a lamp unit disposed in the lamp body and including,
    a light source unit having an LED light source configured to emit light, and a heat sink,
    a structural unit having a reflector that reflects light from the LED light source, a projection lens configured to project the light emitted from the LED light source and reflected by the reflector, a lens holder configured to hold the projection lens, and a light quantity control mechanism that varies an amount of light passing therethrough,
    an irradiating direction changing mechanism, including a drive source, configured to change an irradiating direction of the light emitted from the LED light source and projected by the projection lens,
    a bracket, including a frame-shaped base portion, configured to being operated by a driving force of the irradiating direction changing mechanism and to change an orientation of an optical axis of the projection lens, and
    a support base that supports the bracket,
wherein the structural unit and the light source unit are each directly mounted on the bracket,
wherein the light quantity control mechanism comprises a movable shade that rotates between a first position and a second position, and
wherein a supported portion of the bracket is supported by the support base via a spherical bearing portion as a fulcrum upon operation of the drive source.

2. The vehicle headlamp according to claim 1,
wherein the structural unit is mounted on the bracket from a front of the bracket, and
wherein the light source unit is mounted on the bracket from a rear of the bracket.

3. The vehicle headlamp according to claim 1,
wherein the irradiating direction changing mechanism is mounted on the bracket.

4. The vehicle headlamp according to claim 1,
wherein the bracket is configured to be able to rotate relative to the lamp housing.

5. A vehicle headlamp comprising:
a lamp body including a lamp housing having an opening and a cover covering the opening in the lamp housing; and
a lamp unit disposed in the lamp body and including,
    a light source unit having an LED light source configured to emit light, and a heat sink,
    a structural unit having a reflector that reflects light from the LED light source, a projection lens configured to project the light emitted from the LED light source and reflected by the reflector, a lens holder configured to hold the projection lens, and a light quantity control mechanism that varies an amount of light passing therethrough,
    an irradiating direction changing mechanism, including a drive source, configured to change an irradiating direction of the light emitted from the LED light source and projected by the projection lens,
    a bracket, including a frame-shaped base portion, configured to being operated by a driving force of the irradiating direction changing mechanism and to change an orientation of an optical axis of the projection lens, and
    a support base that supports the bracket,
wherein the structural unit and the light source unit are each directly mounted on the bracket,
wherein the light quantity control mechanism comprises a movable shade that rotates between a first position and a second position, and
wherein a supported portion of the bracket is supported by the support base via a supported shaft as a fulcrum upon operation of the drive source.

* * * * *